United States Patent [19]

Koishi et al.

[11] 3,896,064

[45] July 22, 1975

[54] VEHICLES FOR PRINTING INK

[75] Inventors: Hitoshi Koishi, Tokyo; Yoshihiro Ishida, Kawaguchi, both of Japan

[73] Assignee: Tokyo Printing Ink Mfg. Co., Ltd., Japan

[22] Filed: Apr. 2, 1973

[21] Appl. No.: 347,177

[30] Foreign Application Priority Data

May 17, 1972 Japan.............................. 47-048175

[52] U.S. Cl. ...................... 260/24; 106/27; 106/28; 106/30; 260/78.4 D
[51] Int. Cl............................ C08c 9/18; C08d 3/40
[58] Field of Search ........... 260/78.4 D, 24; 106/27, 106/28, 30

[56] References Cited
UNITED STATES PATENTS
2,948,694   8/1960   Reed.................................... 260/24
3,468,829   9/1969   Yoshioka............................. 260/24

Primary Examiner—Melvyn I. Marquis
Assistant Examiner—William E. Parker
Attorney, Agent, or Firm—Toren, McGeady and Stanger

[57] ABSTRACT

This invention provides vehicles for printing ink containing a resinous ingredient prepared by the addition reaction of a petroleum resin with at least one unsaturated polybasic acid or anhydride thereof and by subsequent reaction of the resultant with rosins or rosin derivatives containing a poly-amine thereby to permit quick setting, bring good gloss and provide good stability on printing presses at low cost.

6 Claims, No Drawings

VEHICLES FOR PRINTING INK

This invention relates to vehicles for printing ink. More particularly, the invention relates to vehicles for printing ink characterized in that a resinous ingredient prepared by the addition reaction of a petroleum resin with at least one unsaturated polybasic acid or anhydride thereof and by a subsequent reaction of the resultant with rosins or rosin derivatives containing a polyamine.

Hitherto, resinous ingredients containing mainly rosins or rosin derivatives generally have been used as the vehicles for lithography printing ink, typography (letterpress) printing ink and gravure printing ink but they have the disadvantage of high cost.

In Japan, a hydrocarbon resin (petroleum resin) prepared at low cost by the polymerization of unsaturated constituents of by-product oils from the petrochemical industry was used instead of resins of rosins or rosin derivatives. However, the petroleum resin has non-polar property, so that inks utilizing such vehicles had very unsatisfactory physical properties, such as, pigment wetting, gloss, water repellency and rub resistance.

In view of the foregoing drawbacks, vehicles containing an esterification product of maleinized petroleum resin or the addition product of a primary amine, primary alkanol amine, or ammonia to maleinized petroleum resin were proposed (Japanese Pat. No. 6823/70). According to the publication, increased proportions of polar and functional groups resulted in less water repellency, and particularly were not good in lithographic printing ink which is based on the repellency of ink and water. Further, in vehicles for letterpress and gravure printing inks, obtaining resins having good solvent release and of proper softening points to give the desired gloss has been difficult. In order to avoid these disadvantages, new attempts have been made in as the Japanese Patent Application No. 82115/71 corresponding to U.S. copending Ser. No. 297,263 which provides a method of adding a petroleum resin to at least one unsaturated polybasic acid or anhydride thereof and then reacting it with a polyalkylene polyamine that contains an alkyl group having from a minimum of 8 to a maximum of 30 carbon atoms in the molecule thereby improving the pigment wetting property without decreasing the water repellency property. Thus, it has been made clear that the petroleum resin can be used as a vehicle for lithographic printing ink. On the other hand, new requirements for vehicles for printing inks, for example, good stability on printing presses, quick disappearance of after-tack after printing on the paper and high gloss are now desired to give the best efficiency and quality.

To attain these properties, it is necessary to provide pigment wetting and water repellency for vehicles for printing inks and also to optimize the relationship between the solubility of the resin and solvent, the softening point of the resin, the molecular weight of the resin and the polar groups of the resin so as to obtain the predetermined printing ink.

We have now found useful vehicles for printing ink free of the aforementioned disadvantages. In other words, this invention is characterized in that a resinous ingredient prepared by the addition reaction of the petroleum resin with unsaturated polybasic acids or anhydrides thereof and by a subsequent reaction of the resultant with rosins or rosin derivatives containing a poly-amine is used as a vehicle. It is, therefore, an object of this invention to provide vehicles for printing ink which have improved pigment wetting properties and solubilities in solvents without any sacrifice of the water resistance and which make possible the adjustments of the softening point and molecular weight of the petroleum resin by bridging of the resin with polyamines.

A further object of this invention is to provide vehicles for printing ink having good stability on printing presses.

Another object of this invention is to provide vehicles for printing ink which enable the ink to set quickly after printing.

Still another object of this invention is to provide vehicles for printing ink which can give prints with excellent gloss and which are available at low cost.

For the purpose of this invention the petroleum resin is, for example, a resinous substance having thermoplastic reactivity. It may be prepared by polymerizing a cracked fraction containing an unsaturated hydrocarbon with a boiling point in the range from 30° to 280°C which is separated out of the petroleum distillates formed by pyrolysis as with steam or by catalytic cracking, in the presence of a catalyst of the Friedel-Craft type or the like. Of the petroleum resins obtained in this way, those having a softening point between 80° and 180°C and a number average molecular weight of 700 to 3,500 give better results.

Such a petroleum resin, which is non-polar, possesses pigment wettability which is too poor for direct use as an ingredient of printing inks. In accordance with this invention, therefore, at least one kind of unsaturated polybasic acid or anhydride thereof is added by a reaction to the petroleum resin in order to give a polar group to the resin and thereby increase its molecular weight. Suitable unsaturated polybasic acids and anhydrides thereof for the practice of this invention include maleic acid, fumaric acid, citraconic acid, tetrahydrophthalic acid, and their anhydrides. They may be used either singly or in a combinations of two or more.

Suitable amounts of unsaturated polybasic acid or anhydride thereof are added in an amount from 0.5 mols per mols of the petroleum resin and if the additive amount is less than 0.5 mol, the vehicle will not have improved pigment wetting property. If the amount is in excess of 3 mols, the vehicle will become poorly compatible, readily oxidizable and tend to react with the pigment to undergo deterioration in quality.

The reaction temperature is between 150° and 250°C and the reaction time is between 1 and 10 hours.

In this case, in order to carry out the reaction of the petroleum resin with such unsaturated polybasic acids or anhydrides thereof, the resin is dissolved in a petroleum solvent or aromatic hydrocarbon solvent and the solution is then heated together with the addition material. Alternatively, the petroleum resin may be singly heated to a molten state and then the addition material may be added dropwise in small amounts to effect an addition reaction in an atmosphere of various inert gases with the application of pressure (1– kg/cm$^2$) or without the application of pressure so as to avoid discoloration due to oxidation.

The reaction product thus obtained was found unsatisfactory in respect of pigment wetting and drying properties, rub resistance, stability, solubility or resin solvent, quick setting (disappearing property of after-tack of ink) and gloss. It has then been found that those properties can be improved by the further addition reaction of rosins or rosin derivatives containing a polyamine after the addition reaction of unsaturated polybasic acids or anhydrides thereof to the petroleum resin.

It is often the case with inks for typography (letterpress) and lithography to use an organic solvent as an ingredient of the vehicle to quicken the setting. Also, vehicles for gravure printing inks usually consist of a resinous ingredient and an organic solvent. In view of these, the resinous ingredient is required to be thoroughly soluble in the organic solvent, particularly those of the petroleum hydrocarbon type which have weak solvent power. The rosins or rosin derivatives having a polyamine can dissolve in most of the solvents available and its solvent retaining power is not excessive. Moreover, the solubility of the resinous ingredient can be adjusted with the type and amount of the rosins or rosin derivatives to be used.

Further, because the amine combined with the rosins or rosin derivatives is polyfunctional, it can bridge the molecular chains of the petroleum resin to increase the molecular weight while, at the same time, raise the softening point of the resin. For example, a reaction condensate of 1 mol of rosin dimer and 2 mols of triamine takes the form of a tetrafunctional amine with two primary amines and two secondary amines. Its softening point is raised upon a reaction with a maleinized petroleum resin.

If the softening point of a resinous ingredient dissolved in an organic solvent for use as an ink vehicle is too low, the solvent releasability of the ink on printed paper will be unsatisfactory, after-tack will remain too long, a period and the setting will be delayed. The amount of resin being equal, the gloss is usually increased in proportion to the molecular weight of the resin. Also, the presence of the amine makes it possible to expect an improvement of the pigment wetting property.

Useful rosins for this invention include gum rosin, wood rosin, tall oil rosin, rosin dimer-partially-polymerized rosin, polymerized rosin, hydrogenated rosin, and disproportional polymerized rosin. Among useful rosin derivatives are rosin-$\alpha\beta$-unsaturated polybasic acid adducts, condensation products of those adducts and polyols, and their mixtures with phenolic resin and the like.

Examples of poly-amines to be condensed with those rosins or rosin derivatives are ethylene diamine, tetramethylene diamine, hexamethylene diamine, N-oleyl trimethylene diamine, N-stearyl trimethylene diamine, N-beef tallow trimethylene diamine, diethylene triamine, triethylene tetramine, tetraethylene pentamine, pentaethylene hexamine, propylene polyamine, butylene polyamine, and N-caster trimethylene diamine.

Usually for the reaction, the poly-amine and rosin are mixed, preferably at a molar ratio of 1:0.5–1:1. For a reaction of the amine with a rosin dimer, a molar ratio of 1:1–1:2 is preferred. In general, a condensation product is obtained by adding from 0.5 to 1.5 mols, preferably from 0.6 to 0.9 mol of a poly-amine to each acid radical of a rosin derivative, and by effecting a condensation reaction of the mixture at a temperature between 100° and 300°C for a period of 1 to 15 hours.

The poly-amine thus added to rosins or rosin derivatives are added in an amount of 0.1 to 2 mols to the amount of an unsaturated polybasic acid or anhydride thereof added to the petroleum resin. If the amount to be added is less than the range above specified, the advantages to be derived from this invention will be lessened. If the amount is excessive, the water resistance of the resulting vehicle will be unfavorably affected. For these reasons the amine is added for the reaction purpose in an amount preferably between 0.3 and 0.8 mol. In order to control the uniformity of the reaction, the reaction time and other variables, it is possible to add to the reaction system, a suitable amount of a solvent which does not react with any substance in the reaction system but is completely soluble, preferably a petroleum hydrocarbon solvent or the like having a boiling point of over 240°C.

A resin prepared by the foregoing reaction is dissolved in a solvent, such as, a petroleum hydrocarbon solvent to obtain a vehicle. The vehicles according to this invention may, of course, be used in mixture with other resins, in which case the resins to be admixed preferably possess suitable compatibility with the reaction products. The compatible resins include, aside from the petroleum resins, various resins such as, alkyd, xylene, rosin, and phenolic resins. Of those resins, iso-, tere- or ortho-phthalic acid alkyd varnishes and urethanized alkyd varnishes of long oil lengths such that drying or semidrying oil accounts for from 85 to 60% of the total amount are preferred because they further improve the pigment wetting property and water repellency of the ink, increase the fluidity of the ink, and promote the formation of a tough drying film by an oxidation reaction without adversely affecting the inherent properties of the modified petroleum resin varnishes.

With or without such a resin, drying oil or semidrying oil may be mixed in a vehicle according to this invention so as to improve the various properties of the resulting ink. Particularly, urethanized oil is preferred since it increases the set velocity of the ink.

The vehicles prepared in confirmity with this invention have applications not only in lithographic inks but also in letterpress inks, rotogravure inks, and paints.

This invention is illustrated by the following examples and references.

EXAMPLE 1

Lithographic ink 480 g of Petrosin 130 [softening point 130°C and bromine value 20 to 40] produced by Mitsui Petrochemical Co., Ltd. is melted by heating at 200°C, and 20 g of anhydrous maleic acid is added, and then the mixture is kept at that temperature for 2 hours to perfect maleinization. Thereafter, 12.5 g of a condensation product obtained by the reaction of 10.5 g of rosin and 2.6 g of diethylene triamine at 200°C over a period of 6 hours is added, and the whole mixture is allowed to react, with stirring, at 200°C for 2 hours. After the reaction, a mixture of 200 g of linseed oil and 350 g of No. 5 solvent [a petroleum hydrocarbon solvent produced by Nippon Oil Co.,] is added and thoroughly mixed with the reaction product to form a varnish. 77 g of the varnish, 20 g of Carmine 6B, and 3 g of drier (manganese naphthenate-lead naphthanate type) are mixed on a three-roll mill to prepare a lithographic ink.

EXAMPLE 2
Lithographic ink

After 480 g of Petrosin 130 has been melted at 200°C, 20 g of anhydrous maleic acid is added and the mixture is held at that temperature for 2 hours so that maleic acid is added by reaction to the petroleum resin. Thereafter, 12.5 g of a condensation product formed by the reaction of 10.9 g of rosin dimer and 2.0 g of diethylene triamine at 200°C for 8 hours is added, and the whole mixture is allowed to react, with stirring, at 200°C for 2 hours. After the reaction, a mixture of 200 g of linseed oil and 350 g of No. 5 solvent is added to the reaction product and thoroughly mixed to prepare a varnish. 77 g of the varnish, 20 g of Carmine 6B, and 3 g of drier are mixed on a three-roll mill, thereby preparing a lithographic ink.

EXAMPLE 3
Rotogravure ink

After 480 g of Petrosin 130 has been melted at 200°C, 40 g of anhydrous maleic acid is added and the mixture is held at that temperature for 2 hours for maleinization. Thereafter, 25.0 g of a condensation product obtained by a reaction of 21.8 g of rosin dimer and 4.1 g of diethylene triamine at 200°C over a period of 8 hours is added, and the whole mixture is allowed to react, with stirring, at 200°C for 2 hours to form a resin for rotogravure ink. 44 g of the resin thus obtained is dissolved in 44 g of toluene, and 88 g of the resulting varnish is mixed with 12 g of Carmine 6B on a ball mill to prepare a rotogravure ink.

REFERENTIAL EXAMPLE 1
Lithographic ink 500 g of 5% maleinized Petrosin 130 is dissolved in 200 g of linseed oil and 350 g of No. 5 solvent at 200°C to form a varnish. 77 g of the varnish is mixed with 20 g of Carmine 6B and 3 g of drier on a three-roll mill to prepare a lithographic ink.

REFERENTIAL EXAMPLE 2
Rotogravure ink 500 g of a resin obtained by 10% maleinized Petrosin 130 is dissolved in 500 g of toluene. 88 g of the resulting varnish and 12 g of Carmine 6B are mixed on a ball mill to prepare a rotogravure ink.

The inks using the vehicles prepared by the foregoing examples of this invention and those by the conventional processes (referential examples) were tested. The results are tabled as below.

|  | Lithographic ink | | | Rotogravure ink | |
| --- | --- | --- | --- | --- | --- |
|  | Ref. Ex. 1 | Ex. 1 | Ex. 2 | Ref. Ex. 2 | Ex. 3 |
| Gloss | Poor | Good | Good | Poor | Good |
| Setting | Ordinary | Quick | Quick | — | — |
| Drying | — | — | — | Very poor | Good |
| Press stability | Very poor | Good | Good | Poor | Good |

What is claimed:

1. In a vehicle for a printing ink composed of a resin with or without a solvent, the improvement wherein the resin is prepared by the addition reaction of a petroleum resin with at least one unsaturated polybasic acid or anhydride thereof in an amount from 0.5 to 3 mols of acid per mol of resin and the subsequent reaction of the resulting addition product with rosin or rosin derivatives containing polyamines in an amount from 0.3 to 0.8 mols based on the amount of said acid in said resin.

2. Vehicles for printing ink according to claim 1 wherein said petroleum resin is a resinous substance of thermoplastic reactivity in which said resinous substance is prepared by polymerizing a cracked fraction containing an unsaturated hydrocarbon with a boiling point in the range from 30°–280°C separated out of the petroleum distillates formed by pyrolysis or catalytic cracking in the presence of a catalyst of Friedel-Craft type.

3. Vehicles for printing ink according to claim 1 wherein said unsaturated polybasic acids or anhydrides thereof are preferably maleic acid, fumaric acid, citraconic acid, tetrahydrophthalic and their anhydrides.

4. Vehicles for printing ink according to claim 1 wherein said rosin is preferably gum rosin, wood rosin, tall oil rosin, rosin dimer-partially-polymerized rosin, polymerized rosin, hydrogenated rosin and disproportional polymerized rosin.

5. Vehicles for printing ink according to claim 1 wherein said rosin derivatives are preferably rosin-$\alpha\beta$-unsaturated polybasic acid addition adducts, condensation products of those addition compounds and polyols and their mixture with phenolic resin.

6. Vehicles for printing ink according to claim 1 wherein said poly-amine are preferably ethylene diamine, tetramethylene diamine, hexamethylene diamine, N-oleyl trimethylene diamine, N-stearyl trimethylene diamine, N-beef tallow trimethylene diamine, diethylene triamine, triethylene tetramine, tetraethylene pentamine, pentaethylene hexamine, propylene polyamine, butylene polyamine and N-caster trimethylene diamine.

* * * * *